Patented Mar. 23, 1948

2,438,136

UNITED STATES PATENT OFFICE 2,438,136

METHOD OF PRODUCING CITRIC ACID

Joseph Szucs, Yonkers, N. Y.

No Drawing. Application April 16, 1946,
Serial No. 662,610

9 Claims. (Cl. 195—36)

This invention relates to a method of producing citric acid by the fermentation of carbohydrates, and it has particular relation to an improved method of producing citric acid by submerged fermentation of carbohydrates.

The main object of this invention is to provide a method of producing citric acid, in which conversion of a suitable carbohydrate into citric acid is carried out in an aerated aqueous solution of a carbohydrate and suitable nutrient compounds by a suitable mold according to the known procedure of submerged fermentation, and in which the formation and yield of citric acid is increased by the addition of a relatively small amount of milk.

I have found that the yield of citric acid obtained by submerged mold fermentation from suitable carbohydrates, particularly sugar materials, may be considerably increased by the presence of a limited amount of milk in the fermentation solution during the citric acid formation.

My present invention may be carried out as follows:

*Example 1.*—To an aqueous solution containing per liter 160 g. of refined sucrose, 0.15 g. of $KH_2PO_4$, 4.5 g. of $MgSO_4.7H_2O$, 3.3 g. of $H_4N.NO_3$, 0.3 g. of KCl, 3.0 g. of $CaCl_2.2H_2O$, and 17.5 cc. of N/1 HCl, 0.5 g. of dry milk were added per liter. I have found that dry skim milk (non-fat dry milk solids), can be used with very satisfactory results in carrying out my invention. The solid, dry milk was first suspended in some water, the suspension sterilized at 100° C. and then added to the above described solution. The pH of this solution was 1.85.

In this solution *Aspergillus niger* was used either in the form of spores or in the form of fresh, young mycelium germinating and/or growing in the solution. Under the conditions described in the present example and in the following Example 2, a globular, caviar-like or "centered" mycelium of limited growth is developed, which is essential for obtaining an undisturbed submerged fermentation and high citric acid yields. The development of such mycelium may be effected by using the entire volume of the fermentation solution or in such a manner that a fraction of the fermentation solution is used for the inoculation with the mold and after sufficient development of the mold, for example after 1–4 days, said fraction is united with the bulk of the fermentation solution.

Submerged fermentation was carried out in aerated solution under vigorous stirring and at ordinary room temperature of 18°–25° C. A rotary stirrer of 300 R. P. M. was used to agitate the fermentation liquid and 75 cc. of air were introduced per minute through a sintered glass layer into a container containing about 2 liters of the fermentation medium.

Under the above conditions, within 9 days a yield of 92% of citric acid was obtained, whereas under similar conditions, but in the absence of milk in the fermentation solution, no higher yields than 70 to 75% are obtained. In the present process no acid other than citric acid was formed.

The above mentioned dry skim milk contains the non-fat milk solids and provides protein, milk sugar, calcium, phosphorus, and also vitamin $B_1$ (thiamin) and vitamin G (riboflavin). I have found that if these vitamins or their mixtures per se are added to the fermentation solution, they do not have a beneficial effect on the submerged citric acid formation. Without limiting myself to any theory, it seems that the colloidal system obtained by the addition of the dry skim milk, favorably influences the formation of very fine gas bubbles and increases the period of time during which the bubbles stay in the fermentation solution, and promotes the oxydative formation of citric acid. Furthermore, it is essential that the presence of milk does not substantially increase the growth of the mold, as any such substantial increase would diminish the yield of citric acid.

*Example 2.*—To an aqueous solution containing per liter 150 g. of refined sucrose, 0.15–1.00 g. of $KH_2PO_4$, 4.5 g. of $MgSO_4.7H_2O$, 3.3 g. of $H_4N.NO_3$, 0.3 g. of KCl, 3.0 g. of $CaCl_2.2H_2O$, and 14 cc. of N/1 HCl, 10 cc. of an aqueous suspension containing 1.0 g. of dry milk of the same quality as described in Example 1, are added per liter. The pH of this solution is 2.0. To 2 liters of this solution, the necessary amount of spores of *Aspergillus niger* in form of a dispersion in 5 cc. of aerosol OT (0.01%) is added, and the further procedure is carried out in the manner described in Example 1. Instead of adding the whole amount of $KH_2PO_4$ to the fermentation solution prior to the addition of the spores, a fraction of $KH_2PO_4$, for example 0.15 g. per liter may be first added, and the residual amount of $KH_2PO_4$ may be added during fermentation.

Under the above conditions, within 7 days a yield of 90% of citric acid was obtained.

In the above described fermentations, the amount of nutrient mineral substances in the fermentation solution is limited in order to avoid undue growth of the mold used. This is one of the essential conditions, in addition to the aeration by means of an oxygen-containing gas, and, first of all, the presence of a limited amount of milk. I have found that fermentation may be carried out in the absence of assimilable phosphorus during the fermentation period in the fermentation solution, or in the presence of assimilable phosphorus in the fermentation solution as shown in the above Example 2. I have found that the presence of, for example, 0.15–1.0 g. of $KH_2PO_4$ has a beneficial effect on the formation of citric acid according to my present invention.

I have found that the use of the above mentioned amount of 0.5–1.0 g. of dry milk per liter of the fermentation solution results in very satisfactory yields. Higher concentrations, such as 1–3 g. of dry milk per liter may also be used, but without advantage in comparison to the use of 0.5–1.0 g. per liter. Lower concentrations of milk, for example the addition of 0.25 g. of dry milk per liter of the fermentation solution also gave beneficial effects. Ordinary liquid milk may also be used in carrying out my invention.

The beneficial effect of the presence of milk may be obtained if the above described conditions are modified within the limits of the invention as defined in the appended claims. For example, other carbohydrates and other molds capable of converting carbohydrates into citric acid, for example other Aspergilli, may be used and the composition of the fermentation liquid may be adapted to the particular mold or other conditions.

I have found that the addition of various substances, such as beer, malt, corn steep liquor, molasses, various plant extracts and various vitamins to the fermentation solution does not improve the production of citric acid from carbohydrates by mold fermentation, and an effect similar to that of my present invention could not be obtained by the addition of any of the above mentioned substances.

It is to be understood that in the present specification and claims the term "aqueous solution containing a limited amount of nutrient mineral substances" is used to denote a solution as described in the above examples, or solutions containing mineral substances of an equivalent nutrient effect on the fermentation mold. Such limited amounts of nutrient mineral substances permit the development of the mold without undue growth which would tend to diminish the yield of citric acid.

Reference is made to my co-pending application Ser. No. 643,823, filed Jan. 26, 1946, now abandoned, of which this is a continuation-in-part.

I claim:

1. A method of producing citric acid by submerged fermentation, comprising subjecting a sugar material to the action of *Aspergillus niger* in an agitated, aqueous solution containing nutrient mineral substances and milk, and passing an oxygen-containing gas through said solution.

2. A method of producing citric acid by submerged fermentation, comprising subjecting a sugar material to the action of *Aspergillus niger* in the presence of nutrient mineral substances and 0.025–0.3% of milk, based on the amount of dry substance, in an agitated aqueous solution, and passing an oxygen-containing gas in finely dispersed condition through said solution.

3. A method of producing citric acid by submerged fermentation comprising subjecting a sugar material to the action of *Aspergillus niger* in the presence of about 0.05–0.1% of dry skim milk (non-fat dry milk solids) in an agitated aqueous solution containing nutrient mineral substances, and passing an oxygen-containing gas through said solution.

4. A method of producing citric acid by submerged fermentation, comprising subjecting a sugar material to the action of *Aspergillus niger* in the presence of about 0.05–0.1% of dry skim milk (non-fat dry milk solids) in an agitated aqueous solution containing nutrient mineral substances, and passing air in finely dispersed condition through said solution.

5. A method of producing citric acid by submerged fermentation, comprising subjecting a sugar material to the action of *Aspergillus niger* at a pH of about 1.8–2.0 in the presence of about 0.05–0.1% of dry skim milk (non-fat dry milk solids) in an agitated aqueous solution containing a sugar material, and a limited amount of nutrient mineral substances including per liter solution 150–160 g. of refined sucrose, 0.15–1.0 g. of $KH_2PO_4$, 4.5 g. of $MgSO_4.7H_2O$, 3.3 g. of $H_4N.NO_3$, 0.3 g. of $KCl$, 3.0 g. of $CaCl_2.2H_2O$, and passing an oxygen-containing gas in finely dispersed condition through the solution.

6. A method of producing citric acid by submerged fermentation, comprising preparing a solution containing a sugar material, and a limited amount of nutrient substances including per liter solution 150–160 g. of refined sucrose, 0.15–1.0 g. of $KH_2PO_4$, 4.5 g. of $MgSO_4.7H_2O$, 3.3 g. of $H_4N.NO_3$, 0.3 g. of $KCl$, 3.0 g. of $CaCl_2.2H_2O$, and 0.5–1.0 g. of dry skim milk (non-fat dry milk solids) adding spores of *Aspergillus niger* dispersed in an aqueous liquid, to the solution, and subjecting the solution to submerged fermentation at a pH of about 1.8–2.0 under agitation and passing an oxygen-containing gas in finely dispersed condition through the solution.

7. A method of producing citric acid by submerged fermentation comprising preparing a solution containing a sugar material and a limited amount of nutrient mineral substances including per liter solution 150–160 g. of refined sucrose, 0.15–1.0 g. of $KH_2PO_4$, 4.5 g. of $MgSO_4.7H_2O$, 3.3 g. of $H_4N.NO_3$, 0.3 g. of $KCl$, 3.0 g. of $CaCl_2.2H_2O$ and 0.5–1.0 g. of dry skim milk (non-fat dry milk solids) adding mycelium of *Aspergillus niger* dispersed in an aqueous liquid to the solution, and subjecting the solution to submerged fermentation at a pH of about 1.8–2.0 under agitation and passing an oxygen-containing gas in finely dispersed condition through the solution.

8. A method of producing citric acid by submerged fermentation comprising subjecting a sugar material to the action of *Aspergillus niger* in the form of globular or centered mycelium of limited growth in an agitated, aqueous solution which contains nutrient mineral substances and 0.025–0.3% of milk, based on the amount of dry substance, and is aerated by an oxygen-containing gas.

9. A method of producing citric acid by submerged fermentation comprising subjecting a sugar material to the action of *Aspergillus niger* in the form of globular or centered mycelium of limited growth in an agitated, aqueous solution containing nutrient mineral substances including an assimilable phosphate, and 0.05–0.1% of dry skim milk (non-fat dry milk solids) and passing air in finely dispersed condition through said solution.

JOSEPH SZUCS.

REFERENCES CITED

The following references are of record in the file of this patent:

UNITED STATES PATENTS

| Number | Name | Date |
|---|---|---|
| 2,394,031 | Waksman et al. | Feb. 5, 1946 |
| 2,072,919 | Zender | Mar. 9, 1939 |

OTHER REFERENCES

Drummond et al., J. Inst. Brew. 38, 264 (1932).
Chemical Abstracts, vol. 30, 4527$^3$ (1936).